United States Patent
Qin et al.

(10) Patent No.: US 10,092,922 B2
(45) Date of Patent: Oct. 9, 2018

(54) INTELLIGENT FLEXIBLE HUB POWDER SPRAYING LINE AND PROCESS

(71) Applicant: CITIC Dicastal CO.,LTD, Qinhuangdao (CN)

(72) Inventors: Zhiwei Qin, Qinhuangdao (CN); Huanming Ma, Qinhuangdao (CN); Hongtao Wang, Qinhuangdao (CN); Bo Ning, Qinhuangdao (CN); Zaide Wang, Qinhuangdao (CN); Zhiliang Zhang, Qinhuangdao (CN); Yongwang Zhao, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 0 days.

(21) Appl. No.: 15/605,464

(22) Filed: May 25, 2017

(65) Prior Publication Data
US 2018/0243780 A1   Aug. 30, 2018

(30) Foreign Application Priority Data
Feb. 25, 2017 (CN) .......................... 2017 1 01051292

(51) Int. Cl.
*B05C 19/00* (2006.01)
*B05B 12/16* (2018.01)
*B05C 19/06* (2006.01)

(52) U.S. Cl.
CPC .............. *B05B 12/16* (2018.02); *B05C 19/00* (2013.01); *B05C 19/06* (2013.01)

(58) Field of Classification Search
USPC ....... 118/500, 686, 712, 713, 308, 309, 306, 118/317, 313–315, 641–643, 66
See application file for complete search history.

(56) References Cited

U.S. PATENT DOCUMENTS

| | | | | |
|---|---|---|---|---|
| 7,786,865 B2* | 8/2010 | Park | ..................... | G06K 7/0008 340/572.1 |
| 2008/0048862 A1* | 2/2008 | Kritt | .................... | G06Q 10/087 340/572.1 |
| 2008/0190775 A1* | 8/2008 | Kawamura | ............. | B60B 27/00 205/122 |

FOREIGN PATENT DOCUMENTS

| CN | 206050918 U | * | 3/2017 |
|---|---|---|---|
| CN | 106622831 A | * | 5/2017 |

OTHER PUBLICATIONS

English Translation CN106622831A (Year: 2017).*
English Translation CN206050918U (Year: 2017).*

* cited by examiner

*Primary Examiner* — Yewebdar T Tadesse
(74) *Attorney, Agent, or Firm* — Calfee, Halter & Griswold LLP

(57) ABSTRACT

The present application discloses an intelligent flexible hub powder spraying line and process. The intelligent flexible hub powder spraying line comprises a control system, a wheel type recognition system, a brace recognition system, a conveying chain, off-line carrying robots, a powder spraying isolation area, an oven, an on-line area, an off-line area and accessory equipment, wherein the conveying chain comprises a chain, braces and a driving mechanism. By applying a plurality of powder spraying units and the recognition systems, multiple kinds of powder can be simultaneously sprayed with different parameters.

8 Claims, 1 Drawing Sheet

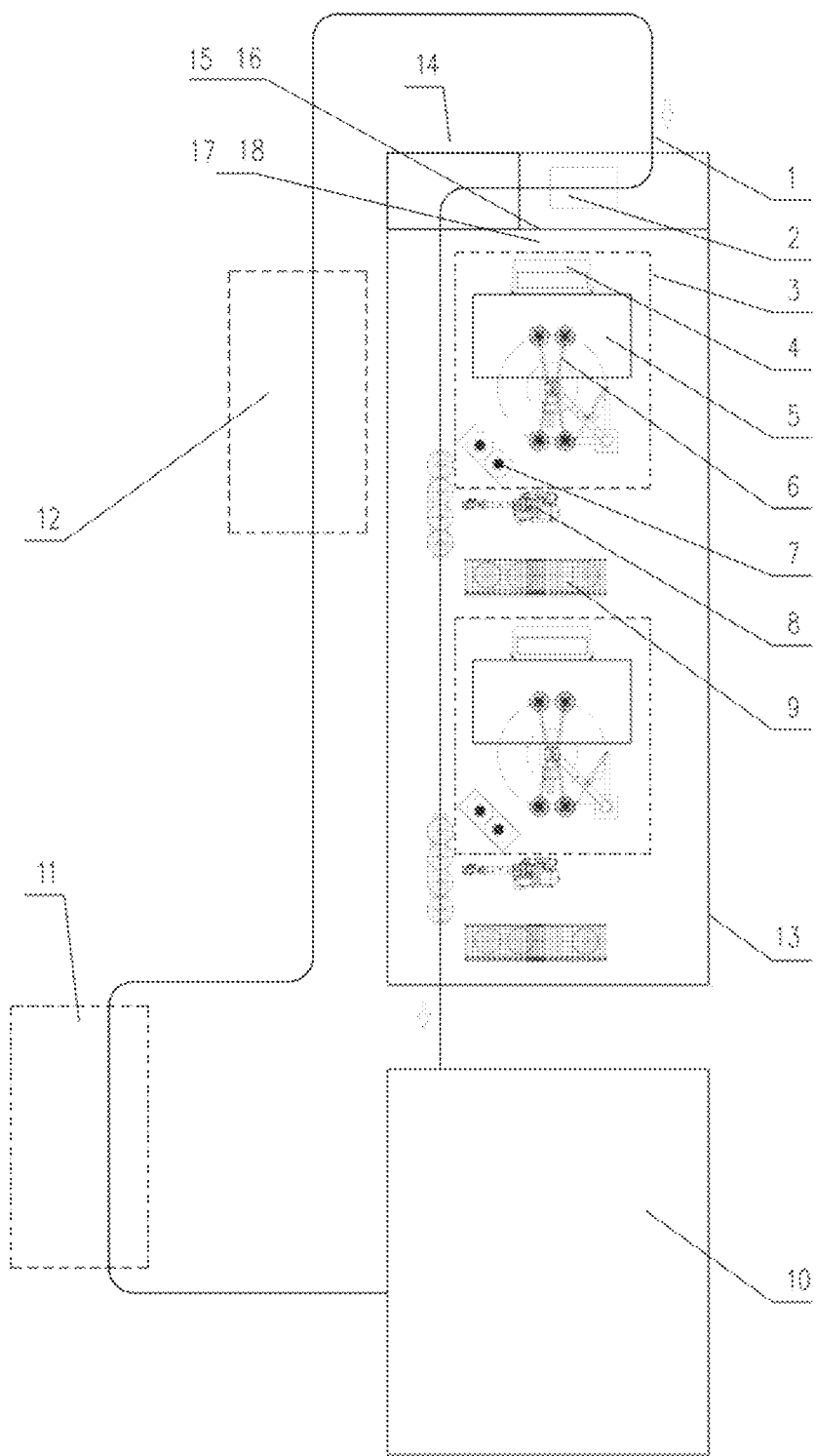

US 10,092,922 B2

INTELLIGENT FLEXIBLE HUB POWDER SPRAYING LINE AND PROCESS

CROSS-REFERENCE TO RELATED APPLICATIONS

This application claims priority to Chinese Patent Application No. 201710105129.2, filed on Feb. 25, 2017, which is hereby incorporated by reference in its entirety.

TECHNICAL FIELD

The present application relates to an intelligent flexible hub powder spraying line and process, and specifically belongs to a hub surface powder spraying technology.

BACKGROUND ART

At present, in the hub manufacturing and spraying field, due to more and more differentiated products, hubs have many shapes and many small batches; only one kind of coating can be simultaneously sprayed in the traditional hub powder spraying line, and a powder room needs to be cleaned thoroughly when the powder coating is replaced, so that powder is easily polluted, the recovered powder cannot be reused and the production efficiency of equipment is low; in addition, because the optimal powder spraying parameters required for spraying different hubs with the same powder are different, spraying with the same parameter inevitably results in non-uniform thickness of the powder and influences the product quality. Therefore, a new hub powder spraying technology is urgently needed to realize mixed-line flexible production of differentiated products, thereby avoiding frequently replacing powder to cause powder pollution and in-process and simultaneously avoiding frequently adjusting the powder spraying parameter to influence product stability and equipment efficiency.

SUMMARY OF THE INVENTION

Aiming at the above shortcomings of the prior art, the subject matter provides an intelligent flexible hub powder spraying line and process, which may avoid frequently replacing powder and adjusting parameters, simultaneously satisfy simultaneous spraying of multiple kinds of powder on any wheel type, greatly improve the utilization rate of equipment, the production efficiency and the quality, realize on-line differentiated products at any time and avoid off-line massive in-process caused by batch production.

The technical solution for solving the technical problems adopted in the subject matter is that an intelligent flexible hub powder spraying line includes a control system, a wheel type recognition system, a brace recognition system, a conveying chain, off-line carrying robots, a powder spraying isolation area, an oven, an on-line area, an off-line area and accessory equipment, and the conveying chain includes a chain, braces and a driving mechanism. A plurality of powder spraying units are serially arranged in the powder spraying isolation area, the hub conveying chain penetrates through the powder spraying isolation area and passes through the outer side of each powder spraying unit, the off-line carrying robots are arranged between the conveying chain and the inlet of each powder spraying unit respectively, each powder spraying unit is equipped with a kind of powder and independently sprays the powder; the wheel type recognition device is arranged in front of the inlet of the powder spraying isolation area and connected with the control system through weak current, a read-write tag is arranged below each brace of the conveying chain, the brace recognition system is composed of the read-write tags as well as tag read-write devices arranged at the wheel type recognition system and the inlets of the powder spraying units, and the tag read-write devices are connected with the control system by adopting weak current; and the oven adopts a radiation heating manner, thus avoiding the influence of interference of different powder on product quality.

Further, the wheel type recognition system adopts a visual recognition system, and performs recognizing and inputting on all wheel type image information before production and edits wheel type code information corresponding to images one by one.

Further, the wheel type recognition system may be a two-dimensional code recognition system, and comprises a two-dimensional code marked at the selected part of the inner cavity of each hub and a two-dimensional code scan gun arranged at the bottom.

Further, the read-write tag may be a radio frequency identification tag, and the corresponding read-write device is a radio frequency identification reader-writer.

Further, the read-write tag may be a two-dimensional code tag, and the corresponding read-write device is a dedicated scan reader-writer.

Further, the powder spraying unit includes a powder room, a hub assembly position powder cleaning device, a rotary workbench and a rotary workbench powder cleaning device, powder spraying stations are arranged in the powder room, and a plurality of spay guns are arranged at each powder spraying station uniformly and correspond to different positions of a hub.

Further, a powder recovery bin is arranged on one side of the powder room and used for recovering powder not adsorbed in the powder spraying process.

Further, a section of temporary storage roller bed is arranged on one side of the off-line carrying robot outside each powder spraying unit and used for placing hubs beyond recognition.

An intelligent flexible hub powder spraying process includes: feeding a hub to be sprayed, recognizing the model of the hub, recognizing the brace, storing wheel type information, feeding the hub into a powder spraying compartment, reading the brace, selecting a powder spraying unit, transferring the hub to the rotary workbench of the selected powder spraying unit, transferring the hub from the rotary workbench to the powder room, beginning spraying powder, completing powder spraying, transferring the hub out of the powder room from the rotary workbench, cleaning powder at the hub assembly position, cleaning powder on the rotary workbench, transferring the hub back to the conveying chain, baking and curing, and discharging the product.

Storing wheel type information means that, after the recognition system recognizes the model of the hub, successfully matched hub characteristic information (including preset wheel type number, hub diameter, wheel width, offset distance, corresponding powder spraying unit, powder spraying program number and other similar information) is stored into a database according to the tag of the corresponding brace, to guide the powder spraying equipment to perform powder spraying operation of different parameters according to the wheel type, including powder spraying quantity, primary air, secondary air, static voltage and current.

Reading the wheel type information means that, when the brace arrives at the tag reader-writer, the tag reader-writer reads the tag of the brace, compares data in the database to obtain feature information of the hub on the brace and sends the feature information to the robot via a network.

Selecting a powder room means judging whether there is a hub corresponding to the powder spraying unit according to the obtained hub information, if so, after the brace triggers fetching and photoelectric detection, the robot acquiring the speed and position of a ground chain to trace the hub, grabbing the corresponding hub when the same speed arrives, and placing the hub on the corresponding rotary workbench.

Spraying powder means that, after the hub is transferred from the rotary workbench to the powder room, the rotary workbench brace in the powder room begins autorotation and sends a hub in-place signal and a corresponding powder spraying program number to the powder spraying system after reaching the preset speed, and the powder spraying system selects the spray guns and the corresponding process parameters according to the received information and the preset powder spraying program to spray powder, thereby ensuring the thickness of powder at each part of a workpiece, improving the powder spraying rate of the workpiece and reducing the waste of powder.

Further, the rotary workbench mentioned in the powder spraying process and production line is configured as a double-station central symmetry structure, the double-station symmetric center is a rotating center, and the two operations of "transferring the hub from the rotary workbench to the powder room" and "transferring the hub out of the powder room from the rotary workbench" in the process flow of the above powder spraying process are performed simultaneously, thereby improving the production efficiency.

The subject matter has the advantages: by applying the plurality of powder spraying units and the recognition systems, multiple kinds of powder can be simultaneously sprayed with different parameters, powder spraying flexible production is realized, frequent powder replacement is avoided, and the utilization rate of equipment is greatly improved; differentiated products are on line at any time, so that off-line in-process is avoided; pollution caused by replacing powder is avoided, and complete recycling of powder can be realized.

BRIEF DESCRIPTION OF DRAWINGS

FIG. 1 is a schematic diagram of an embodiment of the present application.

In FIGURE: 1—conveying chain, 2—wheel type recognition system, 3—powder spraying unit, 4—powder recovery bin, 5—powder room, 6—rotary workbench, 7—powder cleaning device at hub assembly position, 8—off-line carrying robot, 9—temporary storage roller bed, 10—oven, 11—off-line area, 12—on-line area.

DETAILED DESCRIPTION OF THE INVENTION

The present application will be further described in detail below in combination with an embodiment and the accompanying drawing.

As shown in FIG. 1, an intelligent flexible hub powder spraying line includes a control system, a wheel type recognition system 2, a brace recognition system, a conveying chain 1, off-line carrying robots 8, a powder spraying isolation area, an oven 10, an on-line area 12, an off-line area 11 and accessory equipment, and the conveying chain 1 includes a chain, braces and a driving mechanism.

Two powder spraying units 3 are serially arranged in the powder spraying isolation area 13, the hub conveying chain 1 penetrates through the powder spraying isolation area 13 and passes through the outer side of each powder spraying unit 3, the off-line carrying robots 8 are arranged between the conveying chain 1 and the inlet of each powder spraying unit 3 respectively, each powder spraying unit 3 is equipped with a kind of powder and independently sprays the powder; the wheel type visual recognition device is arranged in front of the inlet of the powder spraying isolation area 13 and connected with the control system 14 by adopting weak current, a read-write tag 16 is arranged below each brace 15 of the conveying chain 1, the read-write tag 16 may be a two-dimensional code tag. The brace recognition system 18 is composed of the read-write tag 16 as well as the read-write devices 17 arranged at the wheel type recognition system 2 and the inlets of the powder spraying units 3, and the read-write devices 17 are connected with the control system 14 through weak current, the read-write devices 17 may be two-dimensional code scan guns; and the oven 10 adopts a radiation heating manner, thus avoiding the influence of interference of different powder on product quality.

As shown in FIG. 1, the powder spraying unit 3 includes a powder room 5, a hub assembly position powder cleaning device 7, a rotary workbench 6 and a rotary workbench powder cleaning device, and powder spraying stations are arranged in the powder room; eight spay guns are arranged at each powder spraying station uniformly and correspond to different positions of a hub; a powder recovery bin 4 is arranged on one side of the powder room 5 and used for recovering powder not adsorbed in the powder spraying process; a section of temporary storage roller bed 9 is arranged on one side of the off-line carrying robot 8 outside each powder spraying unit 3 and used for placing hubs beyond recognition.

An intelligent flexible hub powder spraying process includes: feeding a hub to be sprayed, recognizing the model of the hub, recognizing the brace, storing wheel type information, feeding the hub into a powder spraying compartment, reading the brace, selecting a powder spraying unit, transferring the hub to the rotary workbench of the selected powder spraying unit, transferring the hub from the rotary workbench to the powder room, beginning spraying powder, completing powder spraying, transferring the hub out of the powder room from the rotary workbench, cleaning powder at the hub assembly position, cleaning powder on the rotary workbench, transferring the hub back to the conveying chain, baking and curing, and discharging the product.

As shown in FIG. 1, the rotary workbench 6 mentioned in the powder spraying process and production line is configured as a double-station central symmetry structure, the double-station symmetric center is a rotating center, and the two operations of "transferring the hub from the rotary workbench 6 to the powder room 5" and "transferring the hub out of the powder room 5 from the rotary workbench 6" in the process flow of the above powder spraying process are performed simultaneously, thereby improving the production efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent flexible hub powder spraying line, comprising a control system, a wheel type recognition system, a brace recognition system, a conveying chain, off-line carrying robots, a powder spraying isolation area, an oven, an on-line area, an off-line area and accessory equipment, wherein the conveying chain comprises a chain, braces and a driving mechanism, wherein a plurality of powder spraying units are serially arranged in the powder spraying isolation area, the conveying chain for conveying hub penetrates through the powder spraying isolation area and passes through the outer side of each powder spraying unit, one of the off-line carrying robots is arranged between the conveying chain and the inlet of each powder spraying unit respectively, and each powder spraying unit sprays one kind of powder; the wheel type recognition device is arranged in front of the inlet of the powder spraying isolation area and connected with the control system through weak current, a read-write tag is arranged below each brace of the conveying chain, the brace recognition system comprises the read-write tags as well as tag read-write devices arranged at the wheel type recognition system and the inlets of the powder spraying units, and the tag read-write devices are connected with the control system by adopting weak current; and the oven adopts a radiation heating manner.

2. The intelligent flexible hub powder spraying line of claim 1, wherein the wheel type recognition system is a visual recognition system, and performs recognizing and inputting on all wheel type image information before production and edits wheel type code information corresponding to images one by one.

3. The intelligent flexible hub powder spraying line of claim 1, wherein the wheel type recognition system is a two-dimensional code recognition system, and comprises a two-dimensional code marked at the selected part of the inner cavity of each hub and a two-dimensional code scan gun arranged at the bottom.

4. The intelligent flexible hub powder spraying line of claim 1, wherein the read-write tag is a radio frequency identification tag, and the corresponding read-write device is a radio frequency identification reader-writer.

5. The intelligent flexible hub powder spraying line of claim 1, wherein the read-write tag is a two-dimensional code tag, and the corresponding read-write device is a dedicated scan reader-writer.

6. The intelligent flexible hub powder spraying line of claim 1, wherein each of the plurality of powder spraying units comprises a powder room, a hub assembly position powder cleaning device, a rotary workbench and a rotary workbench powder cleaning device, powder spraying stations are arranged in the powder room, and a plurality of spay guns are arranged at each powder spraying station uniformly and correspond to different positions of a hub.

7. The intelligent flexible hub powder spraying line of claim 1, wherein a powder recovery bin is arranged on one side of the powder room.

8. The intelligent flexible hub powder spraying line of claim 1, wherein a section of temporary storage roller bed is arranged on one side of the off-line carrying robot outside each powder spraying unit and used for placing hubs beyond recognition.

* * * * *